United States Patent
Kwa et al.

(10) Patent No.: US 10,096,080 B2
(45) Date of Patent: Oct. 9, 2018

(54) POWER OPTIMIZATION WITH DYNAMIC FRAME RATE SUPPORT

(71) Applicant: Intel Corporation, Santa Clara, CA (US)

(72) Inventors: Seh W. Kwa, Saratoga, CA (US); Nausheen Ansari, Folsom, CA (US); Satyanarayana Avadhanam, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 131 days.

(21) Appl. No.: 14/317,160

(22) Filed: Jun. 27, 2014

(65) Prior Publication Data

US 2015/0379665 A1  Dec. 31, 2015

(51) Int. Cl.
*G06K 9/00* (2006.01)
*G06T 1/20* (2006.01)
*G09G 5/18* (2006.01)
*G09G 5/00* (2006.01)

(52) U.S. Cl.
CPC ............ *G06T 1/20* (2013.01); *G06K 9/00624* (2013.01); *G09G 5/00* (2013.01); *G09G 5/18* (2013.01); *G09G 2330/022* (2013.01); *G09G 2340/0435* (2013.01)

(58) Field of Classification Search
None
See application file for complete search history.

(56) References Cited

U.S. PATENT DOCUMENTS

| | | | | |
|---|---|---|---|---|
| 6,831,618 | B1* | 12/2004 | Suzuki | G09G 3/2029 345/204 |
| 8,692,822 | B2* | 4/2014 | Yanagi | G09G 5/18 345/211 |
| 2005/0135390 | A1 | 6/2005 | Anderson | |
| 2008/0055318 | A1* | 3/2008 | Glen | G09G 3/20 345/501 |
| 2008/0143695 | A1 | 6/2008 | Juenemann | |
| 2008/0316197 | A1 | 12/2008 | Ds | |
| 2010/0123727 | A1 | 5/2010 | Kwa | |
| 2011/0078536 | A1 | 3/2011 | Han | |
| 2012/0079295 | A1* | 3/2012 | Hayek | G06F 1/3218 713/310 |

(Continued)

FOREIGN PATENT DOCUMENTS

| | | |
|---|---|---|
| CN | 102750932 A | 10/2012 |
| TW | 201317975 A | 5/2013 |

(Continued)

OTHER PUBLICATIONS

PCT Search Report and Written Opinion dated Oct. 14, 2015 in corresponding PCT/US2015/037687 (21 pages).

(Continued)

*Primary Examiner* — Yingchun He
(74) *Attorney, Agent, or Firm* — Trop Pruner & Hu, P.C.

(57) ABSTRACT

A frame of pixel data may be burst at a higher frame rate to create a lower effective refresh rate when the actual image update rate is lower than the frame rate. This results in the ability to power manage the transmit portion of the display engine and the receive portion of the panel electronics, while reducing display initiated repetitive memory traffic to conserve power.

24 Claims, 6 Drawing Sheets

(56) References Cited

U.S. PATENT DOCUMENTS

| | | | | |
|---|---|---|---|---|
| 2012/0207208 A1* | 8/2012 | Wyatt | ................. | G06F 3/14 |
| | | | | 375/240.01 |
| 2013/0106872 A1* | 5/2013 | Peng | ................. | G09G 3/20 |
| | | | | 345/519 |
| 2013/0162682 A1 | 6/2013 | Quero et al. | | |
| 2014/0055476 A1 | 2/2014 | Wang | | |

FOREIGN PATENT DOCUMENTS

| | | |
|---|---|---|
| WO | 2018015814 A1 | 7/2008 |
| WO | 2013152123 A2 | 10/2013 |

OTHER PUBLICATIONS

TW office action issued in corresponding TW application 104116072 dated Nov. 30, 2016 (11 pages).
TW office action issued in corresponding TW application 104116072 dated Aug. 16, 2016.
International Preliminary Report on Patentability issued in corresponding PCT application No. PCT/US2015/037687 dated Jan. 5, 2017.
JP office action issued in corresponding JP application 2016-572241 dated Dec. 12, 2017 (6 pages).
EP Search report issued in corresponding EP application 15810993 dated Feb. 12, 2018 (10 pages).
TW office action issued in corresponding TW application 104116072 dated Apr. 19, 2018 (26 pages).

* cited by examiner

POWER OPTIMIZATION WITH DYNAMIC FRAME RATE SUPPORT

BACKGROUND

A display panel with a display screen includes a memory that stores, for each pixel, the color to be displayed. Pixel memory retention times are on the order of tens to hundreds of milliseconds. However, an image may remain on the screen for viewing over an extended viewing period on the order of tens or hundreds of seconds, if not minutes. Thus, the pixel memory is periodically refreshed at what is known as a refresh rate, from a source, such as a processor-based system.

There are known techniques such as MIPI command mode and embedded DisplayPort (eDP) Panel Self Refresh where a frame buffer is integrated into the display panel to create greater memory retention. However, many panels, including most mass market panels, do not have an integrated frame buffer.

The higher the refresh rate, generally the more bandwidth and power are consumed. Thus, the integrated frame buffer may be used to reduce the refresh rate to conserve power.

The pixels are sent to the display, a frame at a time, at a rate called the frame rate. Then, between transmission of two successive frames, the display may be refreshed at a rate called the refresh rate.

SUMMARY

A method comprising detecting an image that does not change for at least two frames, sending only the first frame of the image to a display panel over a display interface, causing a link shutdown for a period of the unchanging image, and power managing the display interface during the link shutdown.

BRIEF DESCRIPTION OF THE DRAWINGS

Some embodiments are described with respect to the following figures.

DETAILED DESCRIPTION

A frame of pixel data may be burst at a higher frame rate (e.g. a 60 Hz frame rate) to create a lower effective refresh rate when the actual image update rate is lower than the frame rate (i.e. less than 60 Hz). This results in the ability to power manage the transmit portion of the display engine and the receive portion of the panel electronics, while reducing display initiated repetitive memory traffic to conserve power.

Figure 1:
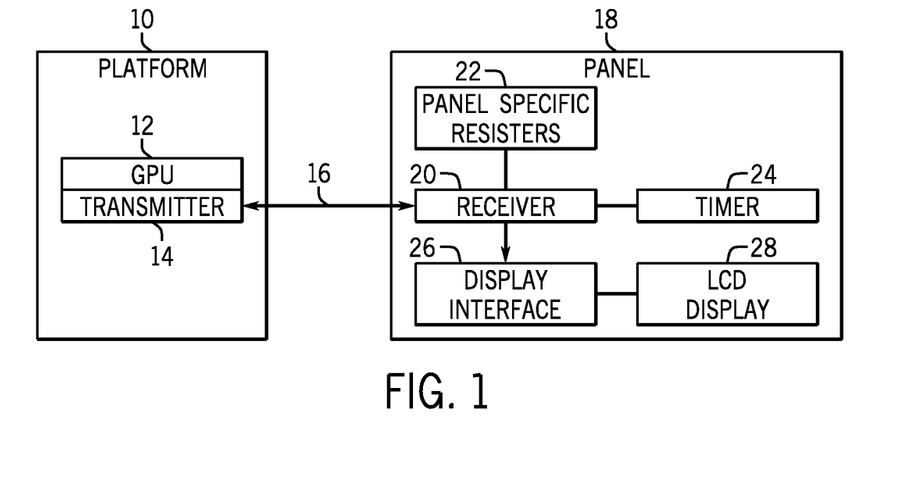
FIG. 1 is a schematic depiction of a display interface for one embodiment.

Referring to FIG. 1, a display interface 16 may interface between a computer platform 10, such as a laptop computer, a desktop computer, an ultrabook, a cellular telephone, or any processor-based device, and a display panel 18, which includes a display, such as an LCD display 28.

The platform 10 may have a graphics processing unit 12 with a transmitter 14 that constitutes a display engine. It sends data for display at a frame rate over the display interface 16. The display interface 16 may be, for example, the DisplayPort interface, in one embodiment. Each transmitted frame is received by a receiver 20 within the panel 18. The receiver 20 provides the frames to the display interface 26 and, in turn, provides the frames for display on the liquid crystal display panel 28. Other types of display panels may also be used.

The receiver 20 may have access to panel specific registers 22, which store information useful in enabling a more gradual transition from a lower effective refresh rate to a higher or normal effective refresh rate to reduce flickering. A timer 24, also coupled to the receiver 20, may provide an expiration time to indicate when to end a link shutdown used to reduce the effective refresh rate. In some embodiments, the receiver 20 may include a processor.

Emerging panel backplane manufacturing techniques are creating display panels with long pixel retention capabilities. Memory buffer integration into the higher resolution display panels is more likely to incur costs above those acceptable with the mass market (lower resolution) display panels. Therefore, it is desirable to extend power management advantages, similar to those achieved with an integrated frame buffer, to the mass market segment (as well as in any case where a frame buffer is not provided in the panel). Even though the power saving benefit may be lower in some cases, the creation of a lower effective refresh rate, with display interface power managed when the image is not changing, may create substantial power consumption reduction in some cases.

Figure 2:
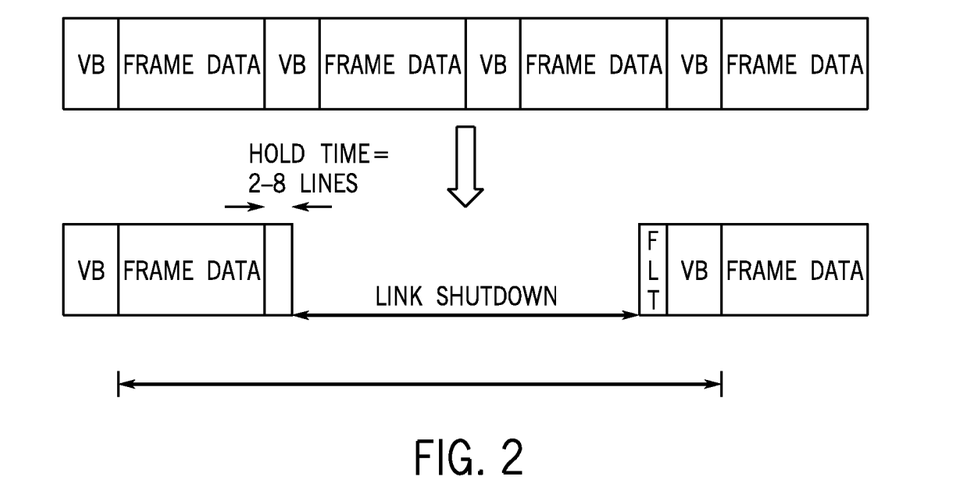
FIG. 2 is a timing diagram for dynamic frame rate support according to one embodiment.

FIG. 2 illustrates the behavior of such mechanism. The top half represents the typical image streaming made up of sequential frames occurring at a first frame rate. The first three frames are identical and the fourth frame is a new update in this example. A vertical blanking interval (VB) occurs between frames. A mechanism creates a lower effective refresh rate, illustrated in the bottom half of FIG. 2, to match a display panel capable of a given refresh rate (20 Hz, as an example). The display engine sends the first frame with a hold time of 2-8 lines (for the pipeline in the panel electronics). Then the display interface is power managed ("Link Shutdown") for two frames. The next two frames which were not sent to the panel, were identical to the first frame anyway. The display interface transmits the new image (or the same image) at the end of the effective third frame time.

When you send frames, you have a given number of refreshes between each frame. So, for example, with a 24 frame per second frame rate and a 120 Hz refresh rate, each frame is refreshed five times. Since two frames are not sent to the display in the example described above, 10 refreshes are avoided (5 per frame), and a lower effective refresh rate results.

Figure 3:
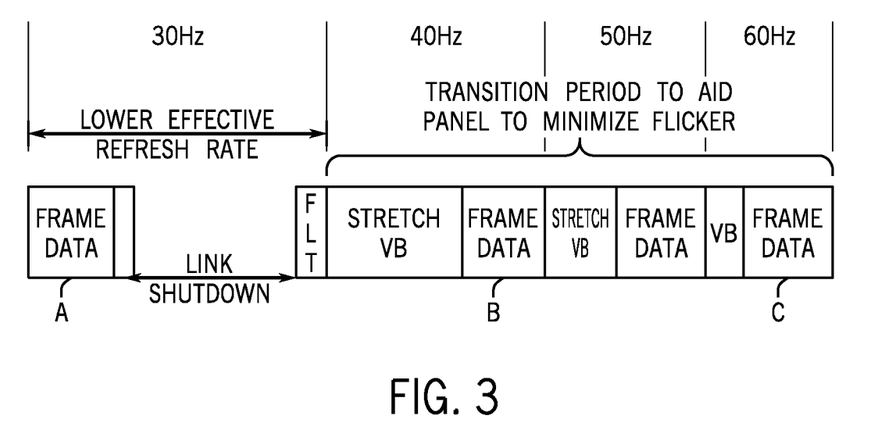
FIG. 3 is a timing diagram for dynamic frame rate with adjustable step size according to one embodiment.

In addition to creating this lower effective refresh rate, it is also desirable to ramp up or down the refresh rate at a step size defined by the characteristics of the display panel. This gradual transition is illustrated in FIG. 3, showing a transition from a low refresh rate (e.g. 30 Hz) to the nominal or normal refresh rate (e.g. 60 Hz) at a step size (e.g. 10 Hz).

Frame A is the last new frame which would have been repeated twice, but the two repeated frames are not sent during link shutdown, and Frame B is then the next new frame. The varying refresh rates during the transition period may be achieved through manipulation of the period of vertical blanking interval of the frame timing. For example, the vertical blanking interval is stretched more at the beginning of the 40 Hz period and less at the beginning of the next step up (50 Hz). Doing so has the benefit of mitigating flickering on the display panels when switching refresh rates. Finally, normal frame rates return with Frame C.

Generally whether consecutive frames are identical is information already available from most compression algorithms.

During the discovery and enumeration stage of platform initialization, a display driver reads two additional panel specific registers 22 from the display panel 18—the expiration time which is the amount of time the display can sustain without pixel data from display engine and the step size for the refresh rate adjustment during the transition period.

Figure 4:
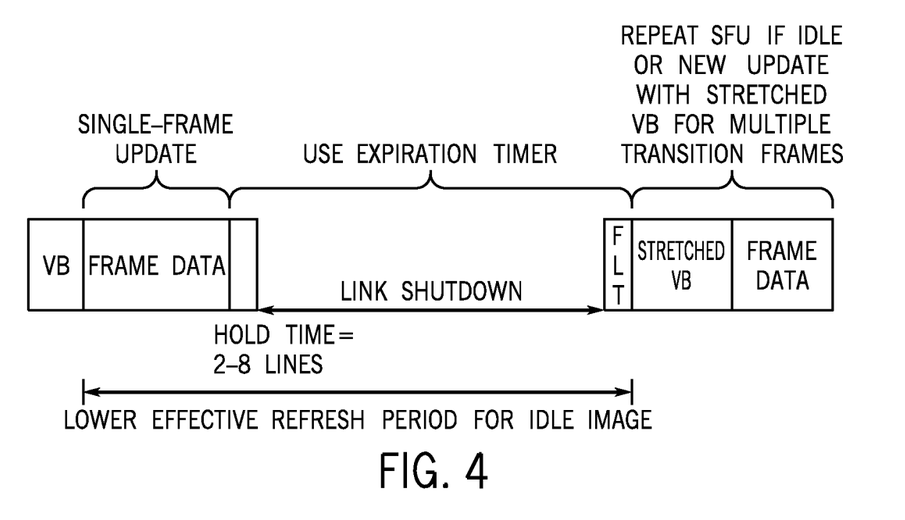
FIG. 4 is a timing diagram for an embodiment using eDP.

An example of one implementation is as follows. Each frame update can be sent to the display panel using embedded DisplayPort (eDP) specification version 1.3) single-frame update (SFU) protocol and then the display interface is power managed (i.e., link shutdown) after the hold time is satisfied, as shown in FIG. 4. The expiration timer 24 (FIG. 1) counts down after sending the pixel data. The single frame update (SFU) may be repeated if idle or instead a new update with a stretched vertical blank interval (VB) may be provided for multiple transition frames.

The display interface wakes up to complete link training through fast link training (FLT). Fast link training takes 1 millisecond to complete and this time is accounted for as part of the expiration time so that the display engine can send the frame data to the display panel in time. This implementation description is meant to illustrate feasibility. Actual implementations may vary, especially across different display interfaces such as those specified by the MIPI Alliance.

A system integrator with operating system and graphics capabilities may modify the silicon behavior dynamically so that either its operating system or graphics driver detects an idle (unchanging) image. A self refresh or panel self refresh technology (available as part of eDP for example) may also be used for simply detecting unchanging images. Graphical activities are a series of program instructions. Lack of program instructions over a time threshold provides an indication of lack of image change. Then, a duty cycle of an image data burst followed by display interface shutdown may achieve a lower effective refresh rate, thereby saving power.

This technique may enhance power optimization for battery operated mobile devices such as laptop, tablet or cellular phones, especially for mass market segments that do not have memory integrated display panels.

Figure 5:
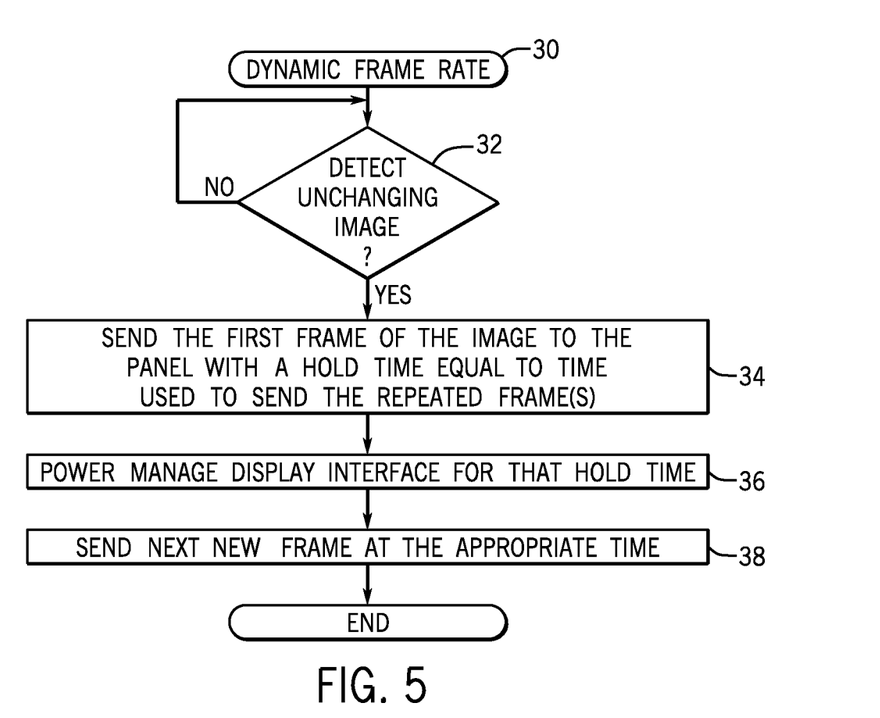
FIG. 5 is a flow chart for a dynamic frame rate.
Figure 6:
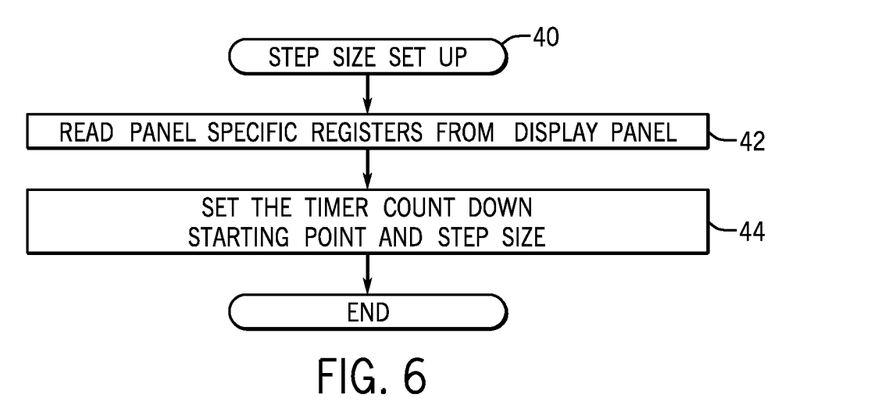
FIG. 6 is a flow chart for setting expiration time and step size for a controllable step size embodiment.
Figure 7:
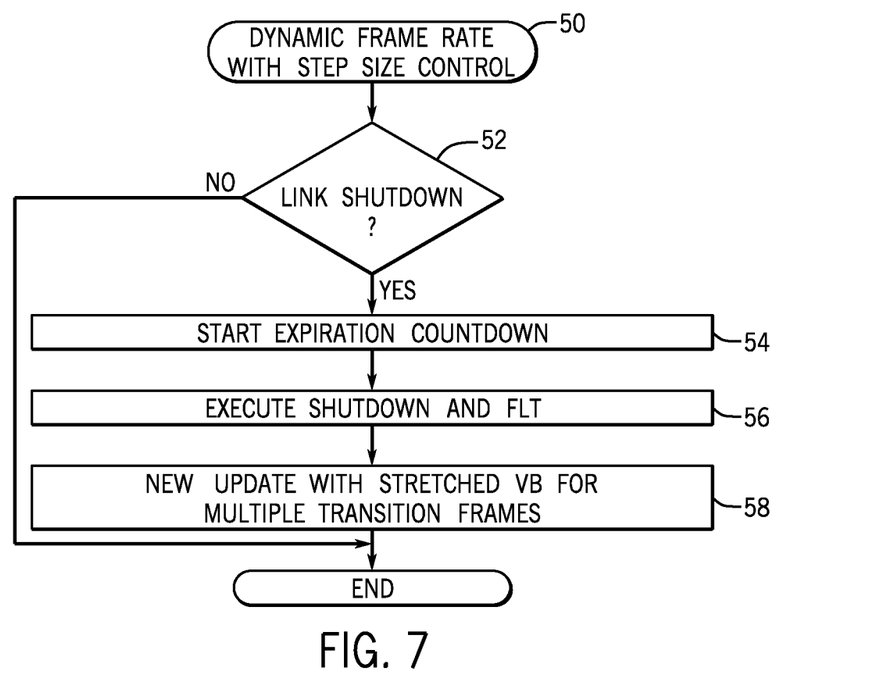
FIG. 7 is a flow chart for implementing a controllable refresh step size embodiment.

Sequences shown in FIGS. 5 through 7 may be implemented in software, firmware and/or hardware. In software and firmware embodiments, the sequences may be implemented by computer executed instructions stored in one or more non-transitory computer readable media resident on the platform in one embodiment. The computer readable storage may include optical, magnetic and/or semiconductor storages. For example, they may be stored in association with the graphics processing unit 12 of FIG. 1.

The sequence shown in FIG. 5 may be used to implement a dynamic frame rate control sequence 30. The sequence begins by detecting an unchanging image as indicated in diamond 32. If there is an unchanging image, the initial frame of the image is sent to the display panel. The initial frame is sent with a hold time equal to the time needed to send the repeated frames of the same image (which in fact will not be sent) at a sustained lower refresh rate (e.g. 40 Hz) as indicated in block 34. Then the display interface is power managed for that hold time as indicated in block 36. Finally, the next new frame is sent at the appropriate time, namely the time it would have taken to send the other two repeated frames, if they would actually have been sent, as indicated in block 38.

Repeated unchanging images may be sent at a lower refresh rate followed by repeatedly exiting from the lower refresh rate in response to expiration of a timer. An interface may also be awakened from a lower power consumption state to a higher power consumption state to send a changed image, and then power consumption may be reduced (by returning to the lower power consumption state) when an image is repeated.

The sequence 40 shown in FIG. 6 may be used to set up the expiration timer and the step size. Panel specific registers are read from the display panel as indicated in block 42. These registers give the step size and the expiration time. Then the timer countdown is started and the step size is set as indicated in block 44 for use when a situation arises where dynamic frame rate may be implemented. Namely, where the image is determined to be unchanging for two or more frames in one embodiment.

However, other step sizes may be set as a threshold for when to implement dynamic frame rate control.

The step size control sequence 50, shown in FIG. 7, begins by detecting the link shutdown as indicated in diamond 52. When the shutdown is detected, the expiration countdown is started with the initial starting point of the timer is already preset as indicated in block 54. Then the shutdown is implemented together with the FLT as indicated in block 56, all within the time set by the expiration timer. Finally at the appropriate time the new update is implemented within an appropriately stretched vertical blanking interval for multiple transition frames as indicated in block 58. Based on the step size, the vertical blanking interval may progressively be reduced to implement the desired step size for transitioning back to the original refresh rate.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

Figure 8:
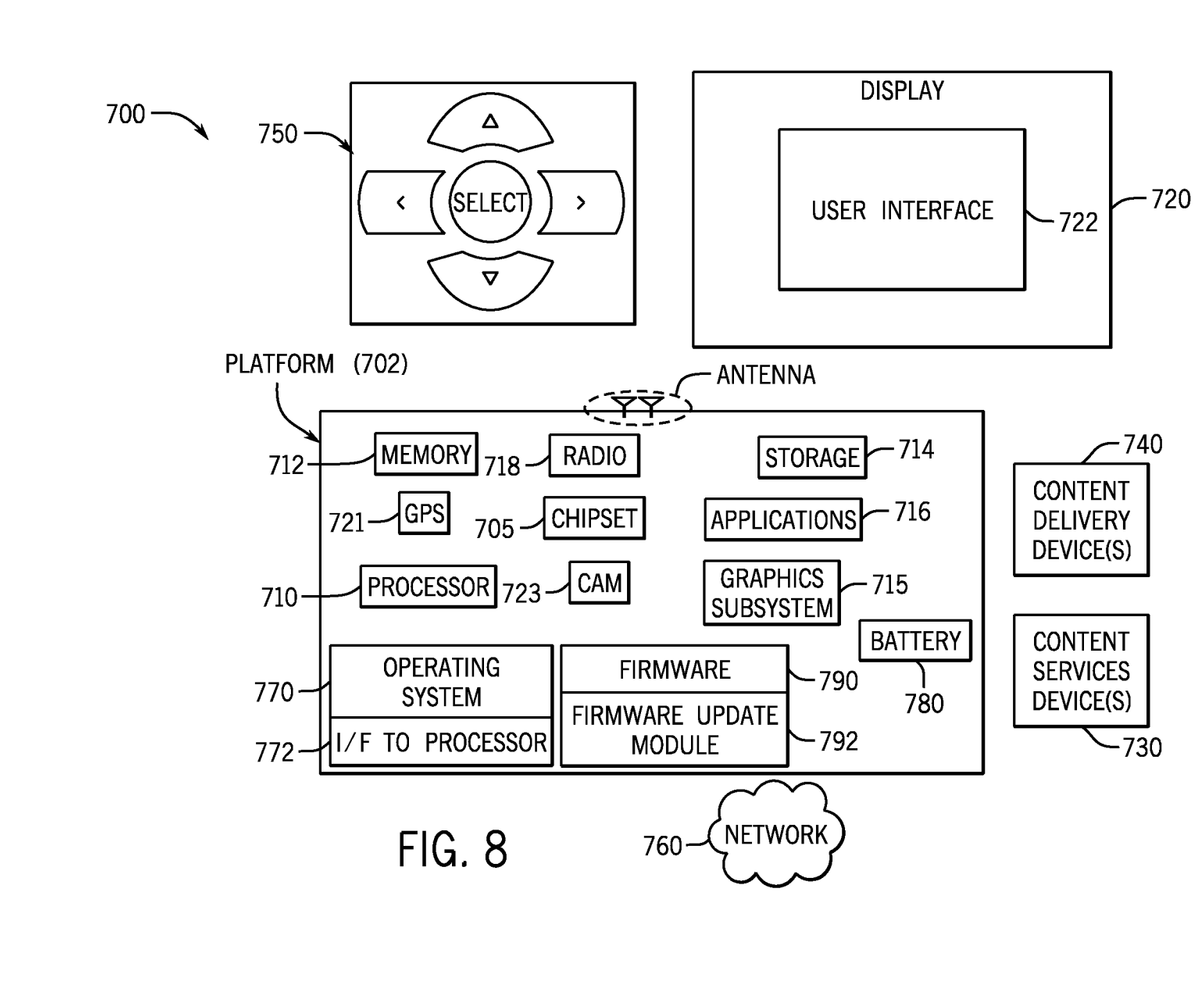
FIG. 8 is a system depiction for one embodiment.

FIG. 8 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequences of FIGS. 5, 6 and 7 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit the applicable embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to be scope limiting.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
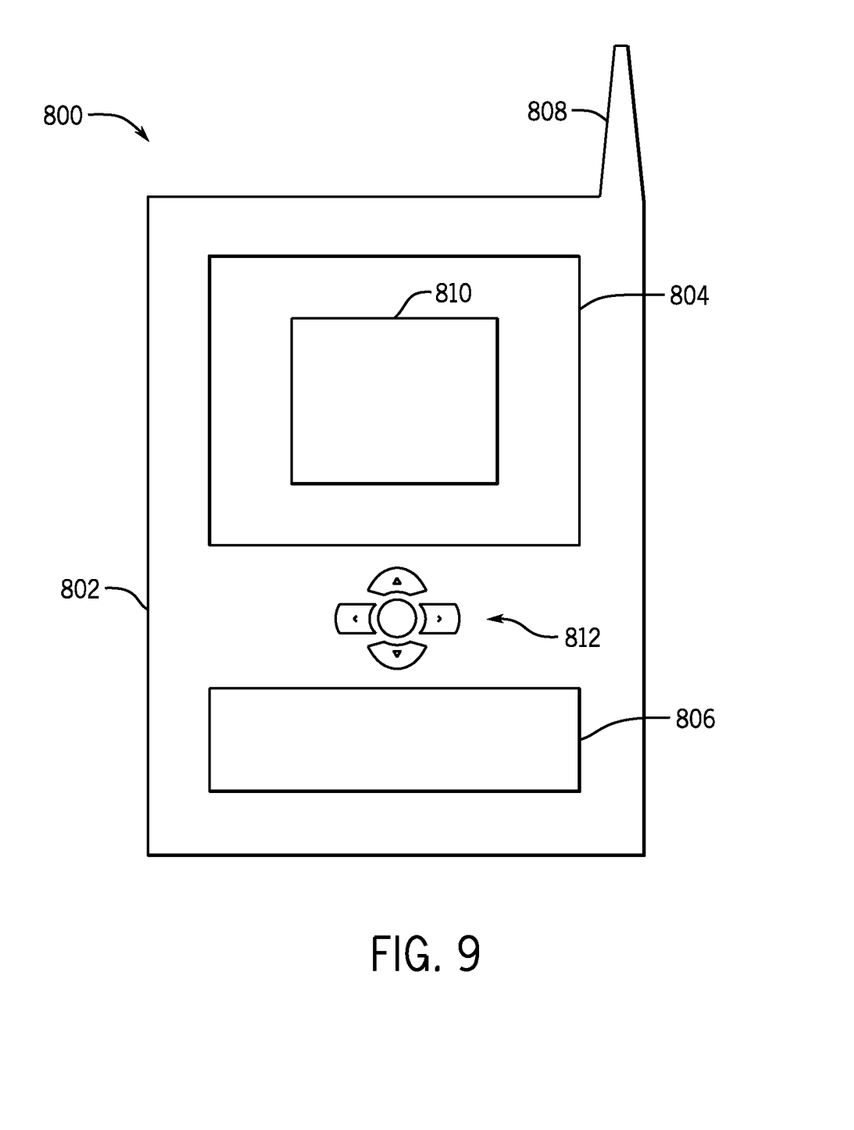
FIG. 9 is a front elevation of a system according to one embodiment.

As described above, system 700 may be embodied in varying physical styles or form factors. FIG. 9 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The following clauses and/or examples pertain to further embodiments:

One example embodiment may be a method comprising detecting an image that does not change for at least two frames, sending only the first frame of the image to a display panel over a display interface, causing a link shutdown for a period of the unchanging image; and power managing the display interface during the link shutdown. The method may also include sending the next changed frame to the display after the link shutdown. The method may also include reading a register on the panel to determine a link shutdown expiration time. The method may also include reading a register on the panel to determine a step size to increase progressively the refresh rate on the panel after the shutdown. The method may also include modifying a vertical blanking interval length after the shutdown. The method may also include increasing the length of the vertical blanking interval after the shutdown. The method may also include progressively decreasing the length of the vertical blanking interval, after resuming from link shutdown, to send a changed image. The method may also include changing the refresh rate, after link shutdown when sending a changed image, to reduce flickering. The method may also include reducing power consumption by reducing the effective refresh rate. The method may also include sending said frame to a panel without a panel frame buffer. The method may also include sending repeated unchanging images at a lower refresh rate and repeatedly exiting from the lower refresh rate in response to expiration of a timer. The method may also include waking an interface to send a changed image, and then reducing power consumption when an image is repeated.

Another example embodiment may be one or more non-transitory computer readable media storing instructions executed by a processor to perform a sequence comprising detecting an image that does not change for at least two frames, sending only the first frame of the image to a display panel over a display interface, causing a link shutdown for a period of the unchanging image, and power managing the display interface during the link shutdown. The media of said sequence may include sending the next changed frame to the display after the link shutdown. The media of said sequence may include reading a register on the panel to determine a link shutdown expiration time. The media of said sequence may include reading a register on the panel to determine a step size to increase progressively the refresh rate on the panel after the shutdown. The media of said sequence may include modifying a vertical blanking interval length after the shutdown. The media of said sequence may include increasing the length of the vertical blanking interval after the shutdown. The media of said sequence may include progressively decreasing the length of the vertical blanking interval, after resuming from link shutdown, to send a changed image. The media of said sequence may include changing the refresh rate, after link shutdown when sending a changed image, to reduce flickering.

In another example embodiment may be an apparatus comprising a processor to detect an image that does not change for at least two frames, send only the first frame of the image to a display panel over a display interface, cause a link shutdown for a period of the unchanging image, and power manage the display interface during the link shutdown, and a storage coupled to said processor. The apparatus may include said processor to send the next changed frame to the display after the link shutdown. The apparatus may include said processor to read a register on the panel to determine a link shutdown expiration time. The apparatus may include said processor to read a register on the panel to determine a step size to increase progressively the refresh rate on the panel after the shutdown. The apparatus may include said processor to modify a vertical blanking interval length after the shutdown. The apparatus may include said processor to increase the length of the vertical blanking interval after the shutdown. The apparatus may include said processor to progressively decrease the length of the vertical blanking interval, after resuming from link shutdown, to send a changed image. The apparatus may include said processor to change the refresh rate, after link shutdown when sending a changed image, to reduce flickering. The apparatus may include said processor to include a display communicatively coupled to the processor. The apparatus may include a battery coupled to the processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
   detecting a first image frame that does not change from a previous second image frame;
   in response to detecting the first image frame that did not change from the previous second image frame, lowering a refresh rate of a display to a lower refresh rate after sending the previous second image frame by refraining from sending the first image frame to the display;
   causing a shutdown of a link to a display panel for a period that includes part of a vertical blanking interval and frame data time of the unsent first image frame, said period beginning after a hold time to account for a pipeline in the display and the period ending before a link training interval; and
   power managing a display interface between a computer platform and the display panel during the link shutdown.

2. The method of claim 1 comprising sending a next changed frame to the display after the link shutdown.

3. The method of claim 1 comprising reading a register on the display panel to determine a link shutdown expiration time.

4. The method of claim 1 comprising increasing the length of the vertical blanking interval after the link shutdown.

5. The method of claim 4 comprising progressively decreasing the length of the vertical blanking interval, after resuming from the link shutdown, to send a changed image frame.

6. The method of claim 1 comprising changing the refresh rate, after the link shutdown when sending a changed image frame, to reduce flickering.

7. The method of claim 1 comprising reducing power consumption by reducing an effective refresh rate.

8. The method of claim 1 comprising sending image frames to the display panel without a panel frame buffer.

9. The method of claim 1 comprising waking an interface to send a changed image frame, and then reducing power consumption when an image frame is repeated.

10. One or more non-transitory computer readable media storing instructions executed by a processor to perform a sequence comprising:
    detecting a first image frame that does not change from a previous second image frame;
    in response to detecting the first image frame that did not change from the previous second image frame, lowering a refresh rate of a display to a lower refresh rate after sending the previous second image frame by refraining from sending the first image frame to the display;
    causing a shutdown of a link to a display panel for a period that includes part of a vertical blanking interval and frame data time of the unsent first image frame, said period beginning after a hold time to account for a pipeline in the display and the period ending before a link training interval; and
    power managing a display interface between a computer platform and the display panel during the link shutdown.

11. The media of claim 10, said sequence comprising sending a next changed frame to the display after the link shutdown.

12. The media of claim 10, said sequence comprising reading a register on the display panel to determine a link shutdown expiration time.

13. The media of claim 10, said sequence comprising increasing the length of the vertical blanking interval after the link shutdown.

14. The media of claim 13, said sequence comprising progressively decreasing the length of the vertical blanking interval, after resuming from the link shutdown, to send a changed image frame.

15. The media of claim 10, said sequence comprising changing the refresh rate, after the link shutdown when sending a changed image frame, to reduce flickering.

16. An apparatus comprising:
a processor to:
- detect a first image frame that does not change from a previous second image frame,
- in response to detecting the first image frame that did not change from the previous second image frame, lower a refresh rate of a display to a lower refresh rate after sending the previous second image frame by refraining from the first image frame to the display,
- cause a shutdown of a link to a display panel for a period that includes part of a vertical blanking interval and frame data time of the unsent first image frame, said period beginning after a hold time to account for a pipeline in the display and the period ending before a link training interval, and
- power manage a display interface between a computer platform and the display panel during the link shutdown; and a storage coupled to said processor.

17. The apparatus of claim 16, said processor further to send a next changed frame to the display after the link shutdown.

18. The apparatus of claim 16, said processor further to read a register on the display panel to determine a link shutdown expiration time.

19. The apparatus of claim 16, said processor further to modify a vertical blanking interval length after the link shutdown.

20. The apparatus of claim 19, said processor further to increase the length of the vertical blanking interval after the link shutdown.

21. The apparatus of claim 20. said processor further to progressively decrease the length of the vertical blanking interval, after resuming from the link shutdown, to send a changed image frame.

22. The apparatus of claim 16, said processor further to change the refresh rate, after the link shutdown when sending a changed image frame, to reduce flickering.

23. The apparatus of claim 16 further comprising a display communicatively coupled to the processor.

24. The apparatus of claim 16 further comprising a battery coupled to the processor.

* * * * *